United States Patent

[11] 3,603,748

| [72] | Inventor | Edward Cryer<br>Higham, near Burnley, England |
|---|---|---|
| [21] | Appl. No. | 834,768 |
| [22] | Filed | June 19, 1969 |
| [45] | Patented | Sept. 7, 1971 |
| [73] | Assignee | Joseph Lucas (Industries) Limited<br>Birmingham, England |
| [32] | Priority | June 28, 1968 |
| [33] | | Great Britain |
| [31] | | 30,902/68 |

[54] ELECTRICAL SWITCHES
10 Claims, 2 Drawing Figs.

[52] U.S. Cl. ..................................................... 200/5 B,
                                                200/61.27, 200/157
[51] Int. Cl. ....................................................... H01h 9/26
[50] Field of Search ........................................... 200/61.27,
                                            61.54, 157, 5, 5 B, 5 C, 5 E

[56] References Cited
UNITED STATES PATENTS

| 2,485,340 | 10/1949 | Warmey | 200/157 X |
| 1,656,562 | 1/1928 | Jones | 200/61.27 |
| 2,812,396 | 11/1957 | Hollins | 200/61.27 X |
| 3,499,125 | 3/1970 | Stoi | 200/61.54 X |

*Primary Examiner*—D. F. Duggan
*Assistant Examiner*—Mark O. Budd
*Attorney*—Holman & Stern

ABSTRACT: An electrical switch comprising a support member, conveniently the operating lever of a direction indicator switch of a road vehicle. A two part body mounted on the support member, and a first pair of contacts supported by the body. Surrounding the body is a sleeve which is slidable axially relative to the body to operate the first pair of contacts, and mounted on the sleeve is an operating member movable transversely relative to the sleeve to operate a second set of contacts carried by the body.

PATENTED SEP 7 1971

3,603,748

SHEET 2 OF 2

INVENTOR
EDWARD CRYER
By Holman, Glascock, Downing
& Seebold
ATTORNEYS

ELECTRICAL SWITCHES

This invention relates to electrical switches for road vehicles.

Figure 1:
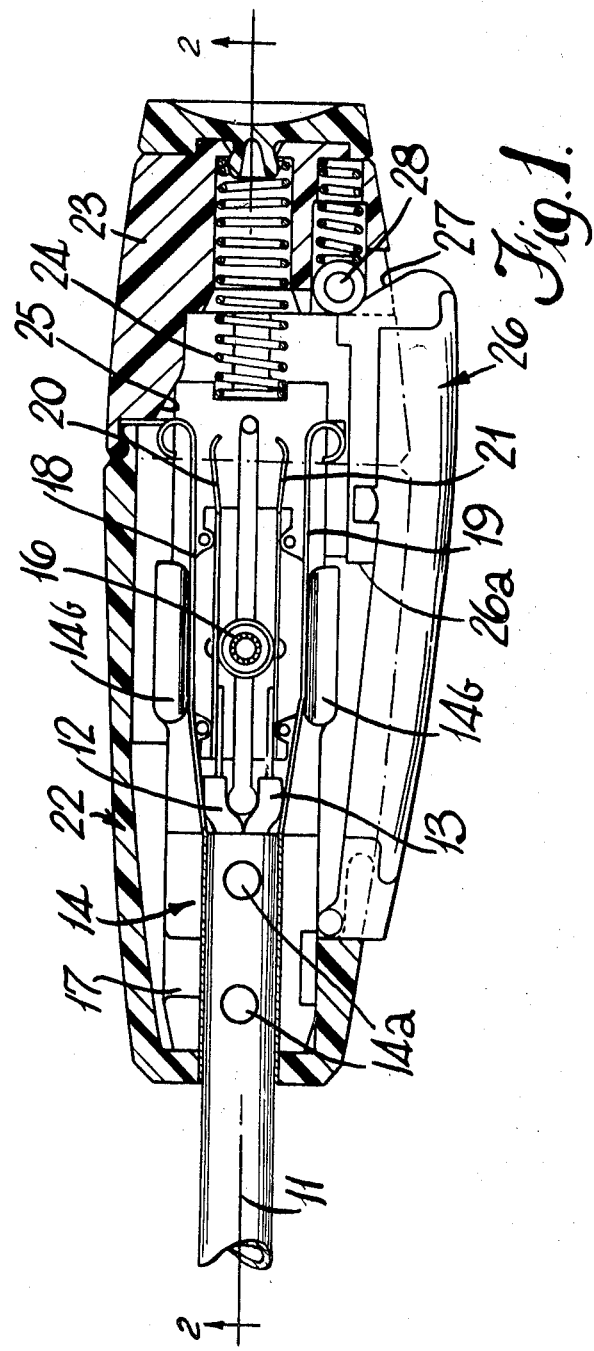

A switch according to the invention includes a support member through which the switch is mounted on a road vehicle, a body carried by the support member, a first pair of contacts supported by the body, a sleeve surrounding said body and movable axially relative to said body to operate said first pair of contacts, a second pair of contacts supported by the body, and an operating member carried by said sleeve and movable transversely relative to said sleeve to operate said second pair of contacts. One example of the invention is illustrated in the accompanying drawings wherein:

FIG. 1 is a part sectional view of an electrical switch, and

Figure 2:
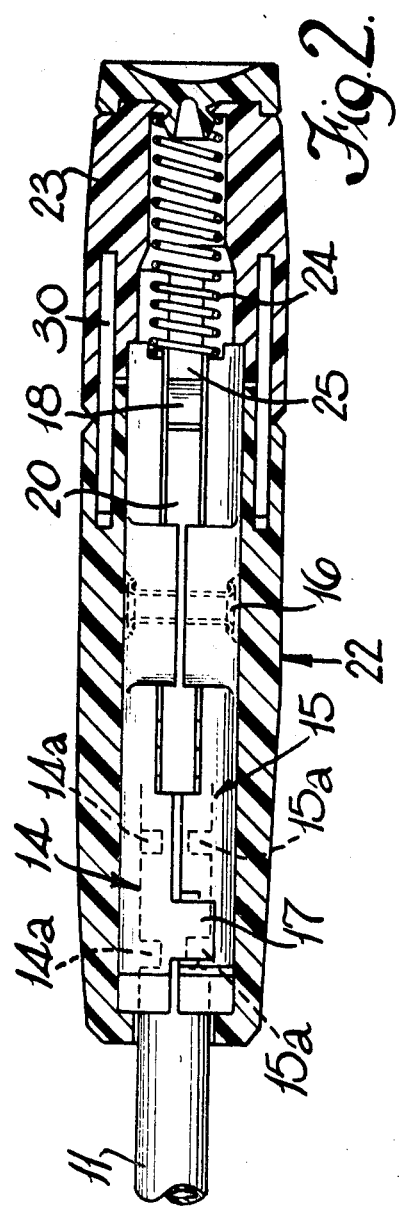

FIG. 2. is a part sectional view on the line 2—2 in FIG. 1.

Referring to the drawings, the switch includes a support member in the form of a hollow conductive lever 11, which at its end remote from the switch is mounted on the steering column of a road vehicle. The lever 11 is the operating lever of the direction indicator switch of the road vehicle. A pair of insulated leads 12, 13 extend within the lever 11 and the switch further includes a moulded synthetic resin body which is formed in two identical parts 14, 15 which are held together when the switch is assembled by a tubular rivet 16, and by a resilient barbed leg 17 on each of the parts 14, 15 which engages a mating shoulder on the other parts. At one end the parts 14, 15 define a cylindrical bore for the reception of the end of the lever 11, and trapped between the lever 11 and the wall of the bore in contact with the lever 11, are the ends of a pair of resilient contact blades 18, 19. The blades 18, 19 are electrically connected to the lever 11, and are located relative to the parts 14, 15 and the lever 11 by posts 14a, 15a integral with the parts 14, 15, which extend through apertures in the ends of the blades 18, 19 and corresponding apertures in the lever 11. The blades 18, 19 are stressed away from one another, and engage respective pairs of stops on the parts 14, 15 respectively, (one pair of stops being shown at 14b in FIG. 1).

The leads 12, 13 are electrically connected at their ends remote from the direction indicator switch to a pair of contact blades 20, 21 respectively, the contact blades 20, 21 being trapped in position within the body 14, 15 by projections integral with the parts 14, 15 during assembly of the switch.

The outer surface of the body is generally cylindrical, and slidably mounted on the body, surrounding the body, is a moulded sleeve 22. Engaged as a snap fit with the open end of the sleeve 22 is a moulded end cover 23. The cover 23 and the sleeve 22 being further interconnected by a pair of pins 30 which are an interference fit in bores in the cover 23 and the sleeve 22. Acting between the end cover 23 and the body is a spring 24 which urges the sleeve 22 to move axially relative to the body away from the direction indicator switch. The inner surface of the end cover 23 adjacent the free end of the contact blade 18 is shaped to define a ramp surface 25, the surface 25 being so arranged that when the sleeve 22 is moved relative to the body against the action of the spring 24, then the surface 25 engages the free end of the blade 18 and flexes the blade 18 inwardly to engage the contact blade 20 and thereby complete an electrical circuit between the lead 12 and the lever 11.

The wall of the sleeve 22 diametrically opposite the contact blade 18 is cut away to define a slot within which is pivotally mounted a moulded trigger 26. The trigger 26 is pivotally engaged with the sleeve 22, at the end of the sleeve 22 adjacent the lever 11, and the trigger 26 and the sleeve 22 include mating surfaces which limit the pivotal movement of the trigger 26 outwardly relative to the sleeve 22. The free end of the trigger 26 is formed with a ramp surface 27, which is engaged by a spring pressed roller 28 carried by the end cover 23, the ramp surface 27 and the spring pressed roller 28 cooperating to urge the trigger member 26 to pivot outwardly relative to the lever 22. The blade contact 19 is so positioned that by depressing the trigger 26 inwardly relative to the sleeve 22, the contact 19 is flexed onto engagement with the blade contact 21, and thereby completes an electrical circuit between the lead 13 and the lever 11. Moreover so that the contacts 18, 20 and the contacts 19, 21 cannot be closed at the same time the trigger 26 is provided with a projection 26a which engages one end of the stop 14b when the trigger is depressed and thereby prevents movement of the sleeve 22 and which is sufficiently close to the side of the stop 14b, when the sleeve 22 is moved, to prevent sufficient depression of the trigger 26 to operate the contacts 19, 21.

In use, in one practical embodiment of the switch the lever 11 is connected to earth, the lead 12 is connected in the horn circuit of the vehicle, and the lead 13 is connected in the headlamp circuit of the vehicle. Thus, by moving the sleeve 22 relative to the body, the horn circuit of the vehicle is completed, and by depressing the trigger 26 the headlamp circuit of the vehicle is completed, it being appreciated that upon release of the trigger 26 the trigger 26 is returned to a position wherein the headlamp circuit is broken, the trigger 26 only being intended to flash the headlamps and not being intended as a main headlamp control switch.

In practice the high operating currents of the horn and the headlamps are not carried by the contacts 18, 19, 20, 21 but are carried by relay contacts operated in response to closure of the contacts 18, 20 and 19, 21.

I claim:

1. An electrical switch including a support member through which the switch is mounted on a road vehicle, a body carried by the support member, a first pair of contacts supported by the body, a sleeve surrounding said body and movable axially relative to said body to operate said first pair of contacts, a second pair of contacts supported by the body, and an operating member carried by said sleeve and movable transversely relative to said sleeve to operate said second pair of contacts.

2. A switch as claimed in claim 1 further including stop means for preventing simultaneous operation of both pairs of contacts.

3. A switch as claimed in claim 1 wherein said operating member is pivotally engaged with said sleeve.

4. A switch as claimed in claim 1 wherein said sleeve and said operating member are urged to rest positions wherein the first and second sets of contacts are open.

5. A switch as claimed in claim 1 wherein said support member is conductive and constitutes part of the electrical path to one of contact of each of said first and second pairs of contacts.

6. A switch as claimed in claim 1 wherein said support member is the operating lever of a control mechanism of a road vehicle.

7. A switch as claimed in claim 6 wherein the control mechanism is a direction indicator switch.

8. A switch as claimed in claim 6 wherein said operating lever is hollow and electrical connections to one contact of each of the first and second pairs of contacts is made by way of respective insulated leads which extend within the lever.

9. A switch as claimed in claim 1 wherein said body comprises a pair of identical parts which are interconnected to define the body.

10. A switch as claimed in claim 1 wherein one contact of each of the first and second pairs of contacts is in the form of a resilient blade.